United States Patent
Tang

(10) Patent No.: US 9,060,171 B2
(45) Date of Patent: Jun. 16, 2015

(54) IMAGE PROCESSING SYSTEM AND METHOD

(75) Inventor: Pei-Chong Tang, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 898 days.

(21) Appl. No.: 13/092,214

(22) Filed: Apr. 22, 2011

(65) Prior Publication Data

US 2011/0267502 A1    Nov. 3, 2011

(30) Foreign Application Priority Data

Apr. 28, 2010    (CN) .......................... 2010 1 0158343

(51) Int. Cl.
*G06K 9/36* (2006.01)
*H04N 19/00* (2014.01)
*H04N 19/134* (2014.01)
*H04N 19/176* (2014.01)
*H04N 19/46* (2014.01)
*H04N 19/60* (2014.01)
*H04N 19/18* (2014.01)
*H04N 19/17* (2014.01)

(52) U.S. Cl.
CPC ........... *H04N 19/134* (2014.11); *H04N 19/176* (2014.11); *H04N 19/46* (2014.11); *H04N 19/60* (2014.11); *H04N 19/18* (2014.11); *H04N 19/17* (2014.11)

(58) Field of Classification Search
None
See application file for complete search history.

(56) References Cited

U.S. PATENT DOCUMENTS

| | | | |
|---|---|---|---|
| 5,745,644 A * | 4/1998 | Yanagihara et al. | 386/314 |
| 5,978,514 A | 11/1999 | Yamaguchi et al. | |
| 5,991,450 A | 11/1999 | Ohsawa et al. | |
| 7,454,080 B1 * | 11/2008 | Martucci et al. | 382/262 |

(Continued)

FOREIGN PATENT DOCUMENTS

| CN | 101159870 A | 4/2008 |
|---|---|---|
| JP | H05292324 | 11/1993 |

(Continued)

OTHER PUBLICATIONS

Ramakrishna Kakarala and Ravikiran Bagadi,"A Method for Signalling Block-Adaptive Quantization in Baseline Sequential JPEG",2009 IEEE Region 10 Conference, pp. 1-6, Singapore.

(Continued)

*Primary Examiner* — Bernard Krasnic
(74) *Attorney, Agent, or Firm* — Novak Druce Connolly Bove + Quigg LLP

(57) ABSTRACT

An image processing system is adapted to compress a captured image having a plurality of regions of interest (ROIs). The image compression device includes an image dividing unit, a resolution distribution unit and an encoder. The image dividing unit divides the captured image into a number of blocks according to a predetermined size. The resolution distribution unit distributes a display resolution to each ROI of the captured image according to predetermined display information which includes a position and a resolution level of each ROI. The resolution distribution unit further obtains the blocks covered by each ROI according to the position of each ROI. The encoder separately encodes each block in the captured image according to the resolution level of each block using predetermined rules to obtain compression strings of each block, and generates compression image based on the compression strings and the predetermined display information.

13 Claims, 8 Drawing Sheets

(56) References Cited

U.S. PATENT DOCUMENTS

| | | | |
|---|---|---|---|
| 7,653,255 B2* | 1/2010 | Rastogi | 382/251 |
| 2006/0072833 A1* | 4/2006 | Ma et al. | 382/232 |
| 2007/0237409 A1* | 10/2007 | Atsumi et al. | 382/239 |
| 2008/0144953 A1* | 6/2008 | Imafuku | 382/246 |
| 2008/0240250 A1* | 10/2008 | Lin et al. | 375/240.18 |
| 2009/0074308 A1 | 3/2009 | Sasaki | |
| 2009/0167948 A1* | 7/2009 | Berman et al. | 348/575 |
| 2009/0251530 A1* | 10/2009 | Cilia | 348/39 |
| 2010/0119157 A1* | 5/2010 | Kameyama | 382/195 |
| 2010/0119164 A1* | 5/2010 | Singhal et al. | 382/233 |
| 2010/0284460 A1* | 11/2010 | Tsai et al. | 375/240.12 |
| 2011/0206249 A1* | 8/2011 | Mathew | 382/128 |

FOREIGN PATENT DOCUMENTS

| | | |
|---|---|---|
| JP | H08140088 | 5/1996 |
| JP | H0974474 | 3/1997 |
| JP | 2000175048 | 6/2000 |
| JP | 2001145107 | 5/2001 |
| JP | 2003179758 | 6/2003 |
| JP | 2005-223852 A | 8/2005 |
| JP | 2008104164 | 5/2008 |
| JP | 2009038782 | 2/2009 |
| WO | WO 2005004062 A2 * | 1/2005 |

OTHER PUBLICATIONS

Ben-Zheng Wei,"Algorithm of Medical Image Segmentation and Compression",Chinese Master's Theses Full-text Database Information Science and Technology, Jun. 15, 2008,See abstract, Jun. 2008,Chinese Academic Journal Electronic Magazines Publishing House,CN.

* cited by examiner

| Serial number of ROI | Position of ROI | Resolution level of ROI |
|---|---|---|
| 1 | P1 | 1 |
| 2 | P2 | 4 |
| 3 | P3 | 0 |
| 4 | P4 | 6 |
| ⋮ | ⋮ | ⋮ |
| N | Pn | 8 |

FIG. 4

 
FIG. 5a  FIG. 5b  FIG. 5c
FIG. 5

IMAGE PROCESSING SYSTEM AND METHOD

CROSS-REFERENCE TO RELATED APPLICATIONS

This application claims priority to Chinese Patent Application No. 201010158343.2 filed on Apr. 28, 2010 in the Chinese Intellectual Property Office.

BACKGROUND

1. Technical Field

The present disclosure relates to image processing technologies, and more particularly to an image processing system and method for compressing or decompressing an image.

2. Description of Related Art

One method for checking a printed circuit board (PCB) to determine whether the PCB is acceptable includes a camera capturing an image of the PCB and compressing the captured image, transmitting the compressed image to a computer, and the computer decompressing the compressed image and analyzing the decompressed image.

However, a typical compression method often encodes the whole compressed image based on relation between two sequential pixels of the captured image, accordingly, the computer decompresses the compressed image also based on the relation between the two sequential pixels of the captured image, thus the entire compressed image needs to be decompressed even if only part of the PCB needs to be checked. As such, the decompressed image may be large and occupy a lot of random access memory space of the computer, and thus the performance of the computer may be degraded.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

FIG. 4 is a schematic view showing predetermined display information of regions of interest of the image; the predetermined display information includes a resolution level, and a position of each region of interest.

FIG. 5 is a schematic view showing a process of distributing a resolution level to each block of the image according to the position of each regions of interest.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
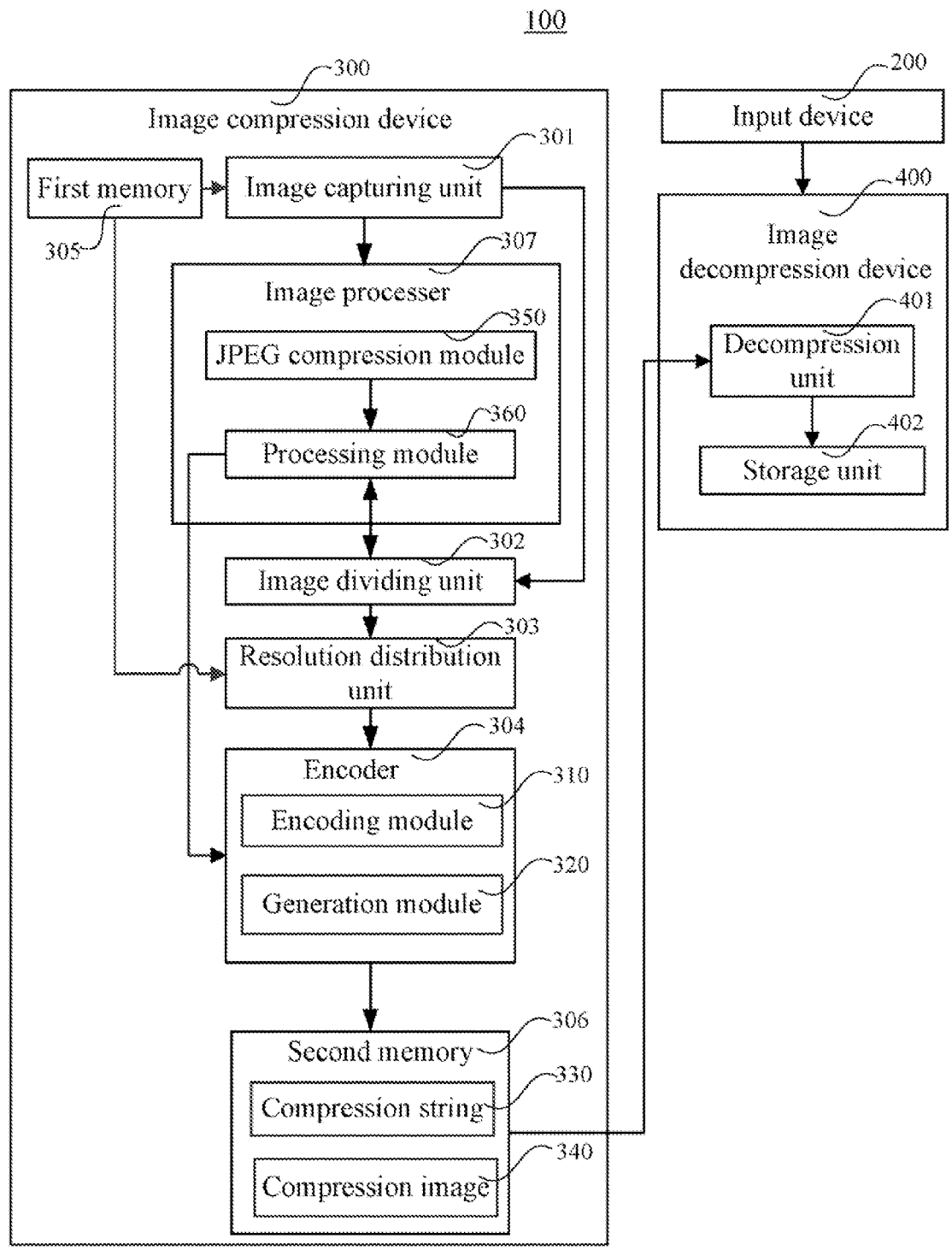
FIG. 1 is a block diagram of an image processing system in accordance with an embodiment.

Referring to FIG. 1, an image processing system 100 for checking an industrial product to determining whether the industrial product is acceptable is provided. The image processing system 100 includes an input device 200, an image compression device 300, and an image decompression device 400.

Figure 2:
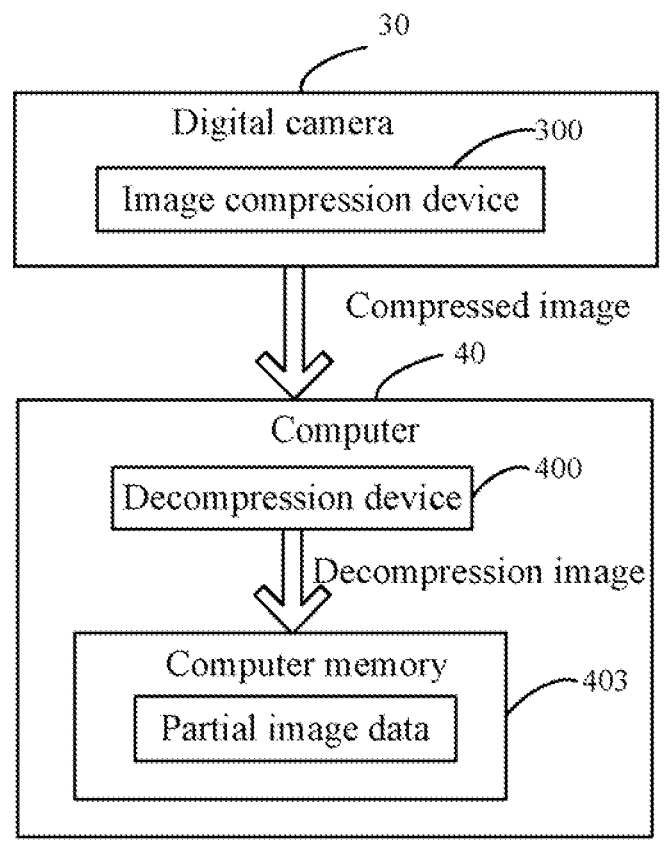
FIG. 2 is a schematic view showing a process of the image processing system in FIG. 1 processing an image.

The image compression device 300 is used for capturing an image of an industrial product, dividing the captured image into a number of blocks, and separately encoding each block according to a predetermined mode to create a compressed image. The input device 200 is used for determining the to-be-decompressed blocks of the compressed image based on user input. The image decompression device 400 is used for decoding the to-be-decompressed blocks according to the predetermined mode. Referring also to FIG. 2, in the embodiment, the image compression device 300 is applied in a camera 30, and the image decompression device 400 is applied in a computer 40 with a memory 403. After the camera 30 captures an image of the industrial product, encodes the captured image according to the predetermined mode, and transmits the compressed image to the computer 40. The computer 40 only decodes the to-be-decompressed blocks of the compressed image according to the predetermined mode and transmits the decompressed blocks to the computer memory 403. As such, only part of the blocks of the compressed image are decompressed and are transmitted to the computer memory 403, thus, less space in the computer memory 403 is occupied, and a performance of the computer 40 will not be degraded.

The image compression device 300 includes an image capturing unit 301, an image dividing unit 302, a resolution distribution unit 303, an encoder 304, a first memory 305, a second memory 306, and an image processor 307.

The image capturing unit 301 is used for capturing the image of the industrial product. The captured image defines a plurality of regions of interest (ROIs) according to electronic elements designed on the industrial product.

Figure 3:
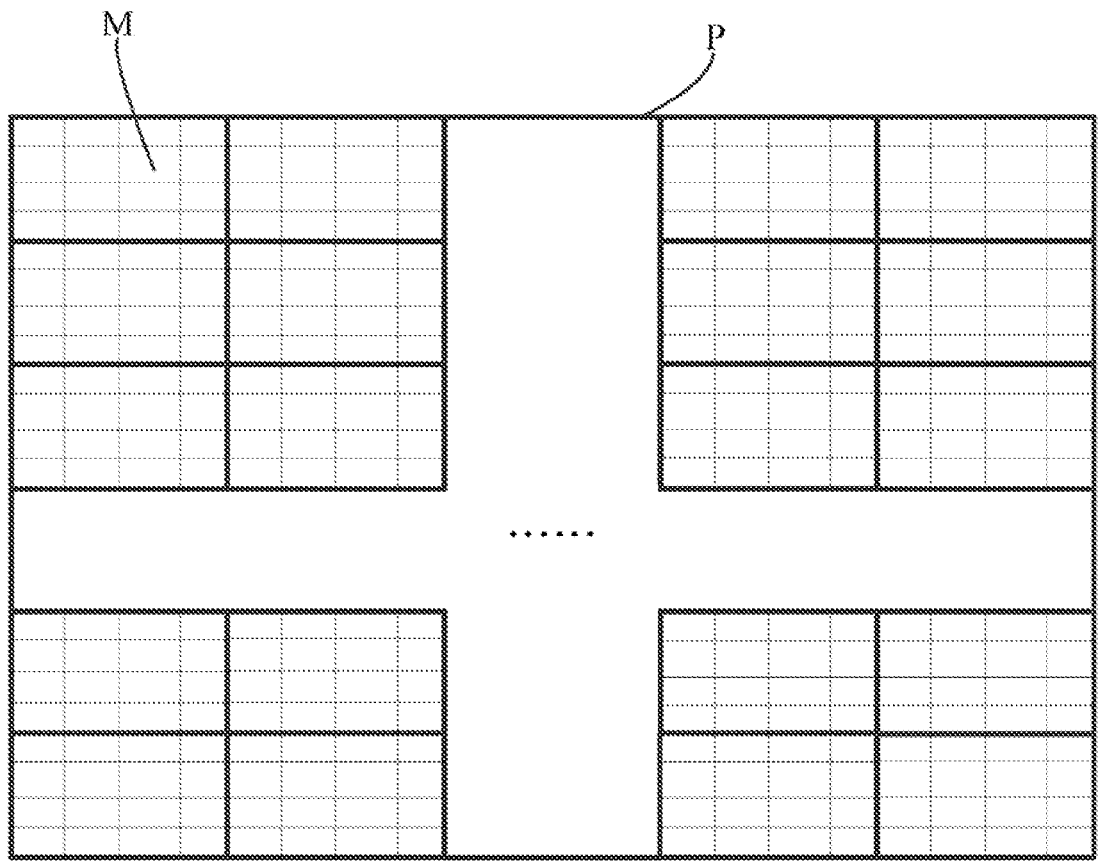
FIG. 3 is a schematic view showing the image divided into a number of blocks by the image processing system in FIG. 1.

The image dividing unit 302 is used for dividing the captured image into a number of blocks according to a predetermined size. In the embodiment, the predetermined size is [16*16] pixels. Referring also to FIG. 3, the size of the captured image P is [40000*40000] pixels, when the predetermined size is [16*16], the number of the block M generated by dividing the captured image P is [2500]*[2500].

The resolution distribution unit 303 is used for distributing a display resolution to each ROI of the captured image according to predetermined display information stored in the first memory 305. Referring also to FIG. 4, the predetermined display information includes a serial number, a position, and a resolution level of each ROI. The resolution distribution unit 303 is capable of obtaining the blocks covered by each ROI according to the position of the ROI. In the embodiment, the industrial product is a PCB which includes a number of electronic elements, such as resistance, capacitance, and transistor. The resolution distribution unit 303 distributes a first resolution level to large electronic elements, and a second resolution level higher than the first display resolution to small electronic element to allow the electronic elements to be displayed clearly.

Referred also to FIG. 5, when one of the blocks is covered by different ROIs, the resolution distribution unit 303 distributes the highest resolution level of the different ROIs to the block. Referring to FIG. 5a, some blocks are covered by two different ROIs, and the resolution levels of the two different ROIs are 4 and 8 respectively. Referring to FIG. 5b, the resolution levels of the blocks covered by the two different ROIs are set as 8.

The resolution distribution unit 303 is further used for distributing at least one resolution level, between the resolution levels of the two different ROIs, to the blocks covered by the ROI having lower resolution level adjacent to the ROI having the higher resolution level, thus the transition between the two different ROIs covering the same blocks is smooth. Referring to FIG. 5c, the resolution levels of the blocks in the ROI having lower resolution level 4 adjacent to the ROI having the higher resolution level 8 are set as 6.

The image processor 307 includes a JPEG compression module 350, and a processing module 360. The JPEG compression module 350 is used for compressing the captured image employing JPEG compression to obtain compression data. In general, the JPEG compression includes color space transformation for converting the captured image from RGB into luminance-chrominance (YUV) color space, down-sampling for reducing the spatial resolution of the U and V components at a predetermined ration such as 4:2:0, block splitting for splitting each one of YUV components into 8*8 blocks, discrete cosine transform (DCT) for converting each 8*8 block of each one of YUV components to obtain 8*8 DCT coefficients matrix which includes one direct current (DC) coefficient in the top-left corner and other 63 alternating current (AC) coefficients, quantization for quantizing 64 DCT coefficients, and entropy coding for encoding the quantized DC coefficient employing differential pulse-code modulation (DPCM), and encoding the quantized AC coefficient employing run-length encoded (RLE), and further encoding the encoded DC and AC coefficient employing Huffman coding to obtain the compression data.

As discussed above, the JPEG compression employs the DPCM to encode the DC coefficients, thus each encoded DC coefficient can't be independently decoded, and further each block of the captured image can't be independently decoded. For each block capable of being independently decoded, the processing module 360 needs to decode the compression data employing Huffman decompression, DPCM and RLE to regain the quantized DC and AC coefficients corresponding to each block.

The encoder 304 includes an encoding module 310 and a generation module 320. The encoding module 310 is used for encoding the quantized DC and AC coefficients corresponding to each block in the captured image obtained by the processing module 360 according to the resolution level of each block using predetermined rules to obtain compression strings 330 of each block. In detail, the encoding module 310 selects all or partial DC and AC coefficients of each block according to the resolution level of each block, that is, some of the DC and AC coefficients may be discarded; then the encoding module 310 encodes the selected AC coefficients employing RLE and Huffman compression. The encoded AC coefficients and the selected DC coefficients combine to form the compression string 330.

The higher the resolution level of one block, the less of the AC coefficients of the block are discarded, and the lower the compression ration, thus the higher the resolution of the decompression block. Correspondingly, the lower the resolution level of one block, the more of the AC coefficients of the block are discarded, and the larger the compression ration, thus the lower the resolution of decompression block.

In the embodiment, the predetermined rules used by the encoding module 310 include a first rule, a second rule, a third rule and a fourth rule. When the resolution level of one block is at least a first predetermined value, such as 8, the first rule is used. The first rule includes selecting all the DC and AC coefficients of each block, encoding the selected AC coefficients employing RLE and Huffman compression, and arranging the selected DC coefficients before the encoded AC coefficients to form the compression string 330.

When the resolution level of one block is between the first predetermined value and a second predetermined value which is less than the first predetermined value, such as between 1 and 8, the second rule is used. The second rule includes selecting the partial DC and AC coefficients of each block according to the resolution level of the block, encoding the selected AC coefficients employing RLE and Huffman compression, and arranging the selected DC coefficients before the encoded AC coefficients to form the compression string 330.

When the resolution level of one block is equal to the second predetermined value, the third rule is used. The third rule includes selecting the partial DC coefficients of each block according to the resolution level of the block, and setting the selected DC coefficients as the compression string 330.

When the resolution level of one block is less than the second predetermined value, such as equal to 0, the fourth rule is used. The fourth rule is discarding all the DC and AC coefficients of each block, that is, the compression string 330 is null.

The generation module 320 for generating the compression image 340 based on the compression string 330 and the predetermined display information stored in the first memory 305, and storing the second compressing data 340 in the second memory 306. The second memory 306 may be a secure digital memory card, or an external hard disc. The second memory 306 and first memory 305 may be two independent memory chips, or two parts of the same memory chip.

Figure 6:
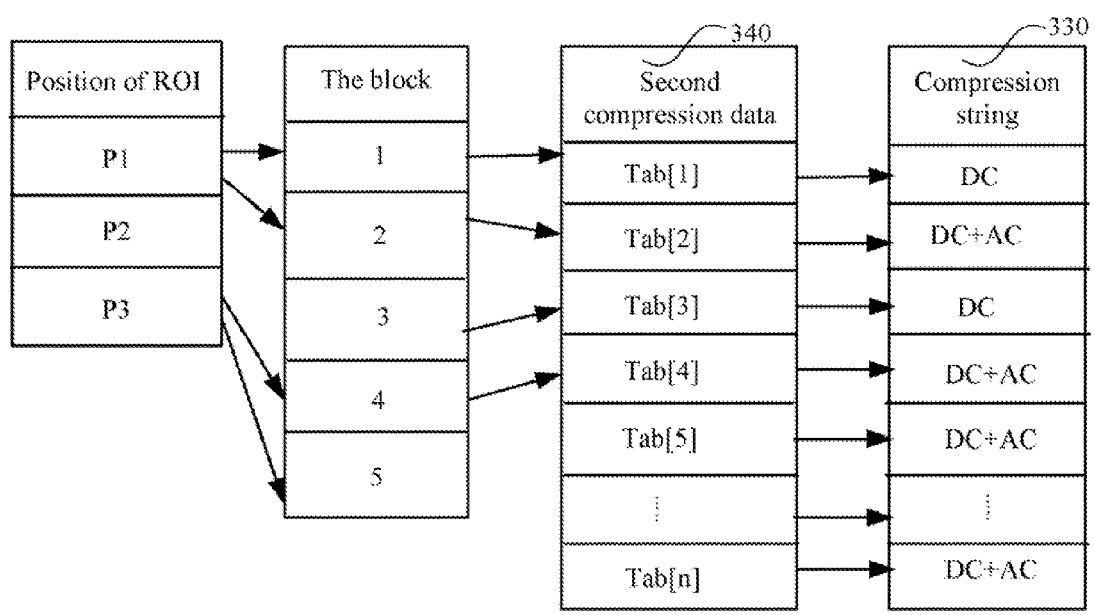
FIG. 6 is a schematic view showing a process of decompressing the image.

Referring also to FIG. 6, the compression image 340 is constituted by a plurality of arrays Tab[ ], and a one to one relationship exists between the arrays Tab[ ] and the blocks, that is, each block of the captured image is independently compressed. If the captured image is divided into [2500*2500] blocks as described above, the number of the arrays Tab[ ] constituting the compression image is also [2500*2500]. Each array Tab[ ] is represented by 32 bits, the high 4 bits thereof represent the resolution level of the corresponding block, and low 24 bits thereof represent a pointer pointing to start address of the compression string 330 of the corresponding block or the DC coefficients of the corresponding block according to the predetermined rules. In detail, when the resolution level of the block is less than the second predetermined value, that is the resolution level of the block is 0 and the compression string 330 of the block is null, the pointer represented by the low 24 bits of one array Tab[ ] points to the DC coefficients of the block. When the resolution level of one block is at least the second predetermined value, that is, the resolution level of the block is at least 1, the pointer represented by the low 24 bits of one array Tab[ ] points to the start address of the compression string 330 of the block.

The input device 200 is used for generating a decompression signal according to user input. The decompression signal includes a position of a to-be-decompressed ROI.

The image decompression device 400 decompresses the blocks of the compression image covered by the to-be-decompressed ROI according to the position of the to-be-decompressed ROI in response to the decompression signal. The image decompression device 400 includes a decompression unit 401 and storage unit 402. The decompression unit 401 is used for obtaining the resolution level and the compression strings 330 of to-be-decompressed blocks of the compression image covered by the to-be-decompressed ROI according to the position of the to-be-decompressed ROI in response to the decompression signal. The decompression unit 401 is further used for decompressing the compression strings 330 of the to-be-decompressed block according to the resolution level of the to-be-decompressed block, and storing the decompressed block in the storage unit 402. In detail, referring to FIG. 6, when the resolution of one to-be-decompressed block is less than the second predetermined value, the decompression unit 401 directly obtains the DC coefficients of the to-be-compressed block. When the resolution level of one to-be-decompressed block is at least the second predetermined value, the decompression unit 401 directly obtains the compression string 330 of the to-be-compressed block only including DC coefficients. When the resolution level of one to-be-compressed block is more than the second predetermined value, the decompression unit 401 obtains the compression string 330 of the to-be-compressed block including DC and encoded AC coefficients, and decodes the encoded AC coefficients employing Huffman and RLE to obtain the decoded AC coefficients.

The decompression unit 401 is further used for dequantizing the DC and decoded AC coefficients to 8*8 DCT coefficients matrix, converting the obtained 8*8 DCT coefficients matrix into each 8*8 block of each one of YUV components using an inverse DCT, and converting each 8*8 block of each one of YUV components from the YUV space into RGB space to obtain the decompression image.

Using the above image processing system 100, each block of the captured image is independently encoded, thus the image decompression device 400 can only decompress partial blocks of the compressed image to be transmitted to the computer memory 403, thus less space in the computer memory 403 is occupied, and the performance of the computer 40 will be not degraded.

Figure 7:
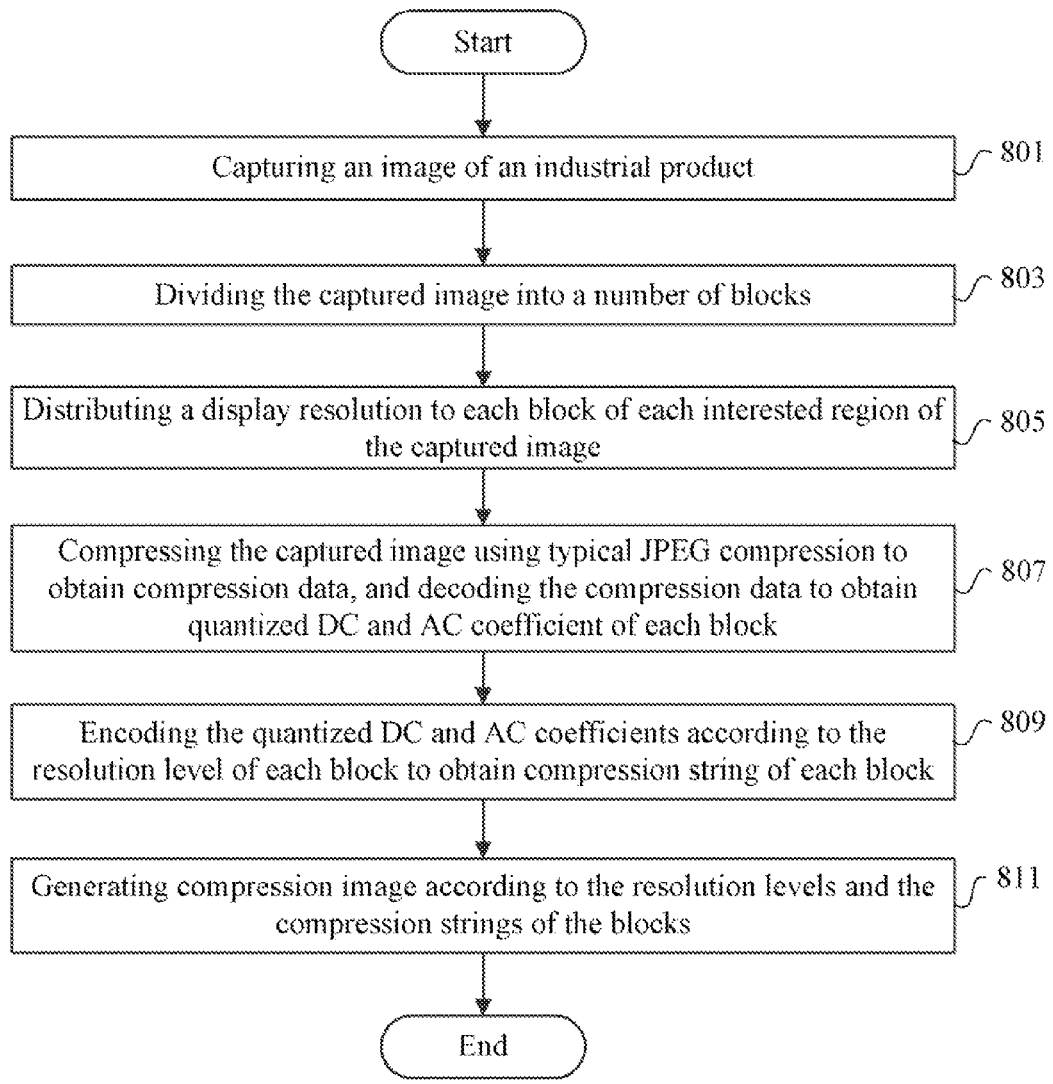
FIG. 7 is a flowchart of a method for compressing an image in accordance with an embodiment.
Figure 8:
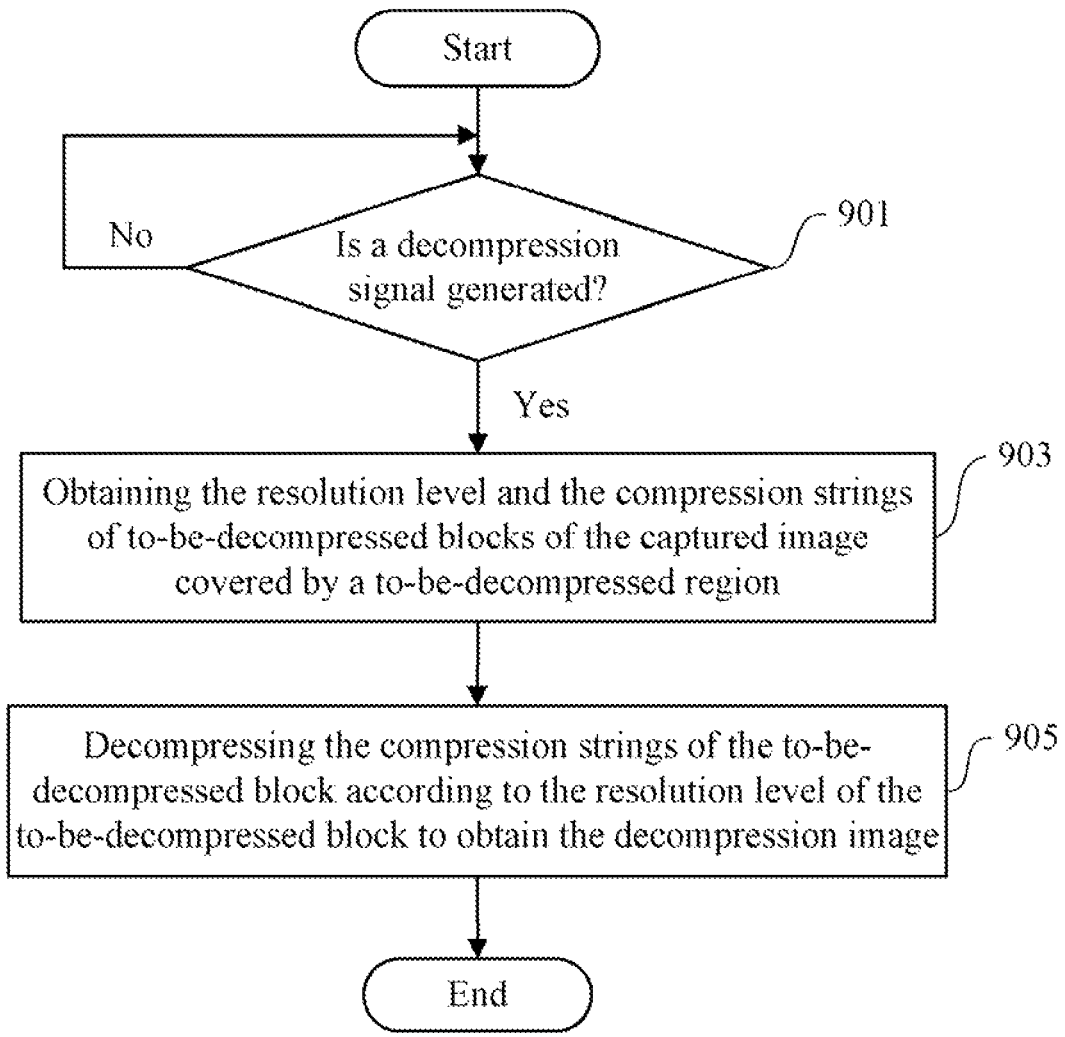
FIG. 8 is a flowchart of a method for decompressing an image in accordance with an embodiment.

Referring to FIGS. 7-8, a method for processing an image is provided. The method for processing image includes a method for compressing an image (see FIG. 7) and a method for decompressing an image (see FIG. 8). The method for compressing the image includes the following steps 801-811.

In step 801, capturing an image of an industrial product. The captured image defines a plurality of regions of interest (ROIs) according to electronic elements designed on the industrial product.

In step 803, dividing the captured image into a number of blocks according to a predetermined size. In the embodiment, the predetermined size is [16*16] pixels. Referring also to FIG. 3, the size of the captured image P is [40000*40000] pixels, when the predetermined size is [16*16], the number of the block M generated by dividing the captured image P is [2500]*[2500].

In step 805, distributing a display resolution to each ROI of the captured image according to predetermined display information. Referring also to FIG. 4, the predetermined display information includes a serial number, a position, and a resolution level of each ROI. The blocks included by each ROI can be obtained according to the position of the ROI. In the embodiment, the industrial product is a PCB which includes a number of electronic elements, such as resistance, capacitance, and transistor. Large electronic elements is distributed a first resolution level, and small electronic element is distributed a second resolution level higher than the first display resolution to allow the electronic elements to be displayed clearly. Referred also to FIG. 5, when one of the blocks is covered by different ROIs, the highest resolution level of the different ROIs is distributed to the block.

Referring to FIG. 5a, some blocks are covered by two different ROIs, and the resolution levels of the two different ROIs are 4 and 8 respectively. Referring to FIG. 5b, the resolution levels of the blocks covered by the two different ROIs are set as 8. Furthermore, at least one resolution level, between the resolution levels of the two different ROIs, is distributed to the blocks covered by the ROI having the lower resolution level adjacent to the ROI having the higher resolution level, thus the transition between the two different ROIs covering the same blocks is smooth. Referring to FIG. 5c, the resolution levels of the blocks in the ROI having lower resolution level 4 adjacent to the ROI having the higher resolution level 8 are set as 6.

In step 807, compressing the captured image employing JPEG compression to obtain compression data, and decoding the compression data to regain the quantized direct current (DC) and alternating current (AC) coefficients corresponding to each block.

In step 809, encoding the quantized DC and AC coefficients corresponding to each block in the captured image according to the resolution level of each block using predetermined rules to obtain compression strings of each block.

In the embodiment, the predetermined rules include a first rule, a second rule, a third rule and a fourth rule. When the resolution level of one block is at least a first predetermined value, such as 8, the first rule is used. The first rule includes selecting all the DC and AC coefficients of each block, encoding the selected AC coefficients employing run-length encoded (RLE) and Huffman compression, and arranging the selected DC coefficients before the encoded AC coefficients to form the compression string. When the resolution level of one block is between the first predetermined value and a second predetermined value which is less than the first predetermined value, such as between 1 and 8, the second rule is used. The second rule includes selecting the partial DC and AC coefficients of each block according to the resolution level of the block, encoding the selected AC coefficients employing RLE and Huffman compression, and arranging the selected DC coefficients before the encoded AC coefficients to form the compression string. When the resolution level of one block is equal to the second predetermined value, the third rule is used. The third rule includes selecting the partial DC coefficients of each block according to the resolution level of the block, and setting the selected DC coefficients as the compression string. When the resolution level of one block is less than the second predetermined value, such as equal to 0, the fourth rule is used. The fourth rule is discarding all the DC and AC coefficients of each block, that is, the compression string is null.

In step 811, generating compression image based on the compression string and the predetermined display information. The compression image is constituted by a plurality of arrays Tab[ ] (FIG. 6), and a one to one relationship exists between the arrays Tab[ ] and the blocks, that is, each block of the captured image is independently compressed. If the captured image is divided into [2500*2500] blocks as described above, the number of the arrays Tab[ ] constituting the compression image is also [2500*2500]. Each array Tab[ ] is represented by 32 bits, the high 4 bits thereof represent the resolution level of the corresponding block, and low 24 bits thereof represent a pointer pointing to start address of the compression string of the corresponding block or the DC coefficients of the corresponding block according to the predetermined rules. In detail, when the resolution level of the block is less than the second predetermined value, that is the resolution level of the block is 0 and the compression string of the block is null, the pointer represented by the low 24 bits of one array Tab[ ] points to the DC coefficients of the block. When the resolution level of one block is at least the second predetermined value, that is, the resolution level of the block is at least 1, the pointer represented by the low 24 bits of one array Tab[ ] points to the start address of the compression string of the block.

The method for decompressing the image includes the following steps 901-905.

In step 901, determining whether a decompression signal is generated. If it is determined that the decompression signal is generated, step 903 is implemented. If it is determined that the decompression signal is not generated, step 901 is repeated. The decompression signal includes a position of a to-be-decompressed ROI.

In step 903, obtaining the resolution level and the compression strings of to-be-decompressed blocks of the captured image covered by the to-be-decompressed ROI according to the position of the to-be-decompressed ROI included by the decompression signal in response to the decompression signal.

In step 905, decompressing the compression strings of the to-be-decompressed blocks according to the resolution level of the to-be-decompressed block to obtain the decompression image. In detail, referring to FIG. 6, when the resolution of one of the to-be-decompressed block is less than the predetermined value, the DC coefficients of the to-be-compressed block are directly obtained. When the resolution level of one of the to-be-decompressed block is at least the second predetermined value, the compression strings of the to-be-compressed block only including DC coefficients are obtained. When the resolution level of one of the to-be-compressed block is more than the second predetermined value, the compression strings of the to-be-compressed block including DC and the encoded AC coefficients are obtained, and the encoded AC coefficients are decoded employing Huffman and RLE to obtain the decoded AC coefficients. The DC and decoded AC coefficients is dequantized to 8*8 DCT coefficients matrix. The obtained 8*8 DCT coefficients matrix is converted into each 8*8 block of each one of luminance-chrominance (YUV) components using an inverse DCT. Each 8*8 block of each one of YUV components is converted from the YUV space into RGB space to obtain the decompression image.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An image processing system, comprising:
an image compression device configured to compress a captured image, the captured image defining a plurality of regions of interest (ROIs), the image compression device comprising:
an image dividing unit configured to divide the captured image into a number of blocks according to a predetermined size;
a resolution distribution unit configured to distribute a display resolution to each ROI of the captured image according to predetermined display information, the predetermined display information comprising a position and a resolution level of each ROI, the resolution distribution unit further configured to obtain the blocks covered by each ROI according to the position of each ROI;
an encoder configured to separately encode each block in the captured image according to the resolution level of each block using predetermined rules to obtain compression strings of each block, and generating compression image based on the compression strings and the predetermined display information; and
an image processor configured to process each block of each one of luminance-chrominance (YUV) components to obtain quantized direct current (DC) and alternating current (AC) coefficients;
wherein:
the encoder encodes the quantized DC and AC coefficients of each block according to the resolution level of each block using the predetermined rules to obtain the compression strings, the encoder further comprises an encoding module for encoding the quantized AC coefficients corresponding to each block in the captured image according to the resolution level of each block using the predetermined rules to obtain the compression strings of each block, the encoding module selects all or partial DC and AC coefficients of each block according to the resolution level of each block, and then encodes the selected AC coefficients; the encoded AC coefficients and the selected DC coefficients of each block combine to form the compression string of each block; and
the predetermined rules comprise a first rule, a second rule, a third rule and a fourth rule; when the resolution level of one block is at least a first predetermined value, the first rule is used to obtain the compression strings; the first rule comprises selecting all the DC and AC coefficients of each block, encoding the selected AC coefficients, and arranging the selected DC coefficients before the encoded AC coefficients to form the compression string; when the resolution level of one block is between the first predetermined value and a second predetermined value which is less than the first predetermined value, the second rule is used to obtain the compression strings, the second rule comprises selecting the partial DC and AC coefficients of each block according to the resolution level of the block, encoding the selected AC coefficients, and arranging the selected DC coefficients before the encoded AC coefficients to form the compression string; when the resolution level of one block is equal to the second predetermined value, the third rule is used to obtain the compression strings, the third rule comprises selecting the partial DC coefficients of each block according to the resolution level of the block, and setting the selected DC coefficients as the compression string; and when the resolution level of one block is less than the second predetermined value, the fourth rule is used to obtain the compression strings, the fourth rule is discarding all the DC and AC coefficients of each block, thus the compression string is null.

2. The system according to claim 1, wherein the image processor comprises a JPEG compression module for compressing the captured image employing JPEG compression to obtain compression data; the image processor decodes the compression data to obtain the quantized DC and AC coefficients corresponding to each block.

3. The system according to claim 1, wherein the encoder further comprises a generation module configured to generate the compression image based on the compression strings and the predetermined display information; the compression image is constituted by a plurality of arrays and a one to one relationship exists between the arrays and the blocks; each array comprises the resolution level of the corresponding block and a pointer pointing to start address of the compression string of the corresponding block or the DC coefficients of the corresponding block; when the resolution level of the block is less than the second predetermined value, the compression string is null, the pointer of one array points to the DC coefficients of the block; when the resolution level of one block is at least the second predetermined value; the pointer of one array points to the start address of the compression string of the block.

4. The system according to claim 1, wherein when one of the blocks is covered by different ROIs, the resolution distribution unit distributes a highest resolution level of the different ROIs to the block.

5. The system according to claim 4, wherein the resolution distribution unit is further configured to distribute at least one resolution level, between the resolution levels of two different ROIs, to the blocks covered by the ROI having lower resolution level adjacent to the ROI having the higher resolution level, thus a transition between the two different ROIs covering the same blocks is smooth.

6. The system according to claim 1, further comprising an input device and an image decompression device; the input device is configured to generate a decompression signal according to user input, and the decompression signal comprises a position of a to-be-decompressed ROI; the image decompression device decompresses the blocks of the compression image covered by the to-be-decompressed ROI according to the position of the to-be-decompressed ROI in response to the decompression signal.

7. An image processing method, comprising:
  capturing an image which defines a plurality of regions of interest (ROIs);
  dividing the captured image into a number of blocks according to a predetermined size;
  distributing a display resolution to each ROI of the captured image according to predetermined display information comprising a position and a resolution level of each ROI;
  separately encoding each block in the captured image according to the resolution level of each block using predetermined rules to obtain compression strings of each block; and
  generating compression image based on the compression strings and the predetermined display information;
  wherein the step of separately encoding each block in the captured image according to the resolution level of each block using predetermined rules to obtain compression strings of each block further comprises:
  processing each block of each one of luminance-chrominance (YUV) components to obtain quantized direct current (DC) and alternating current (AC) coefficients; and
  encoding the quantized DC and AC coefficients of each block according to the resolution level of each block using the predetermined rules to obtain the compression strings;
  wherein the step of encoding the quantized DC and AC coefficients of each block according to the resolution level of each block using the predetermined rules to obtain the compression strings further comprises:
  selecting all or partial quantized DC and AC coefficients of each block according to the resolution level of each block;
  encoding the selected AC coefficients corresponding to each block in the captured image according to the resolution level of each block using the predetermined rules to obtain the compression strings of each block; and
  combining the encoded AC coefficients and the selected DC coefficients of each block to form the compression string of each block;
  wherein the predetermined rules comprise a first rule, a second rule, a third rule and a fourth rule; when the resolution level of one block is at least a first predetermined value, the first rule is used to obtain the compression strings; the first rule comprises selecting all the DC and AC coefficients of each block, encoding the selected AC coefficients, and arranging the selected DC coefficients before the encoded AC coefficients to form the compression string; when the resolution level of one block is between the first predetermined value and a second predetermined value which is less than the first predetermined value, the second rule is used to obtain the compression strings, the second rule comprises selecting the partial DC and AC coefficients of each block according to the resolution level of the block, encoding the selected AC coefficients, and arranging the selected DC coefficients before the encoded AC coefficients to form the compression string; when the resolution level of one block is equal to the second predetermined value, the third rule is used to obtain the compression strings, the third rule comprises selecting the partial DC coefficients of each block according to the resolution level of the block, and setting the selected DC coefficients as the compression string; and when the resolution level of one block is less than the second predetermined value, the fourth rule is used to obtain the compression strings, the fourth rule is discarding all the DC and AC coefficients of each block, thus the compression string is null.

8. The method according to claim 7, wherein the step of processing each block of each one of YUV components to obtain quantized DC and AC coefficients further comprises:
  compressing the captured image employing JPEG compression to obtain compression data; and
  decoding the compression data to obtain the quantized DC and AC coefficients corresponding to each block.

9. The method according to claim 7, wherein the compression image is constituted by a plurality of arrays, and a one to one relationship exists between the arrays and the blocks; each array comprises the resolution level of the corresponding block and a pointer pointing to a start address of the compression string of the corresponding block or the DC coefficients of the corresponding block; when the resolution level of the block is less than the second predetermined value, the compression string is null, the pointer of one array points to the DC coefficients of the block; when the resolution level of one block is at least the second predetermined value; the pointer of one array points to the start address of the compression string of the block.

10. The method according to claim 9, further comprising:
  determining whether a decompression signal is generated, the decompression signal comprising a position of a to-be-decompressed ROI; and
  decompressing the blocks of the compression image covered by the to-be-decompressed ROI according to the position of the to-be-decompressed ROI if the decompression signal is generated.

11. The method according to claim 10, wherein the step of decompressing the blocks of the compression image covered by the to-be-decompressed ROI according to the position of the to-be-decompressed ROI if the decompression signal is generated further comprises:
- obtaining the resolution level and the compression strings of to-be-decompressed blocks of the captured image covered by the to-be-decompressed ROI according to the position of the to-be-decompressed ROI comprised by the decompression signal if the decompression signal is generated; and
- decompressing the compression strings of the to-be-decompressed block according to the resolution level of the to-be-decompressed block to obtain decompression image.

12. The method according to claim 7, wherein when one of the blocks is covered by different ROIs, a highest resolution level of the different ROIs is distributed to the block.

13. The method according to claim 12, wherein at least one resolution level, between the resolution levels of two different ROIs, is distributed to the blocks covered by the ROI having lower resolution level adjacent to the ROI having the higher resolution level, thus a transition between the two different ROIs covering the same blocks is smooth.

\* \* \* \* \*